United States Patent
Ramasamy Muthusamy et al.

(10) Patent No.: US 12,278,906 B2
(45) Date of Patent: Apr. 15, 2025

(54) METHOD AND DEVICE FOR CHECKING AN INCOMING SECURED, ENCRYPTED MESSAGE

(71) Applicant: Robert Bosch GmbH, Stuttgart (DE)

(72) Inventors: Gobinath Ramasamy Muthusamy, Heilbronn (DE); Martin Friedrich, Untergruppenbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 372 days.

(21) Appl. No.: 17/650,474

(22) Filed: Feb. 9, 2022

(65) Prior Publication Data

US 2022/0271941 A1  Aug. 25, 2022

(30) Foreign Application Priority Data

Feb. 16, 2021   (DE) ...................... 10 2021 201 444.5

(51) Int. Cl.
 *H04L 9/32*   (2006.01)
(52) U.S. Cl.
 CPC ........ *H04L 9/3242* (2013.01); *H04L 2209/84* (2013.01)
(58) Field of Classification Search
 CPC .. H04L 9/3242; H04L 2209/84; H04L 9/3234

USPC ......................................................... 713/181
See application file for complete search history.

(56) References Cited

U.S. PATENT DOCUMENTS

| | | | |
|---|---|---|---|
| 10,095,634 B2 * | 10/2018 | Sharma | G06F 13/4265 |
| 11,951,917 B2 * | 4/2024 | Iwata | B60R 16/0231 |
| 2016/0255154 A1 * | 9/2016 | Kim | H04L 63/08 726/25 |
| 2020/0244442 A1 * | 7/2020 | Zeh | H04L 9/3242 |

FOREIGN PATENT DOCUMENTS

| | | |
|---|---|---|
| DE | 102013206185 A1 | 10/2014 |
| DE | 102017209557 A1 | 12/2018 |

OTHER PUBLICATIONS

SEDAN: Security-Aware Design of Time-Critical Automotive Networks, Kukkala et al, Aug. 2020 (Year: 2020).*

* cited by examiner

*Primary Examiner* — Jahangir Kabir
(74) *Attorney, Agent, or Firm* — NORTON ROSE FULBRIGHT US LLP; Gerard A. Messina

(57) ABSTRACT

A method for checking an incoming message. In the method, based on the message authentication code, an authentication of the useful data is performed by a hardware security module and the hardware security module is subjected to a function check.

7 Claims, 2 Drawing Sheets

METHOD AND DEVICE FOR CHECKING AN INCOMING SECURED, ENCRYPTED MESSAGE

CROSS REFERENCE

The present application claims the benefit under 35 U.S.C. § 119 of German Patent Application No. DE 10 2021 201 444.5 filed on Feb. 16, 2021, which is expressly incorporated herein in its entirety.

FIELD

The present invention relates to a method for checking an incoming message. The present invention further relates to a corresponding device, a corresponding computer program, and a corresponding memory medium.

BACKGROUND INFORMATION

With the ever-increasing complexity of electronic components in vehicles, the possibility of malfunctions also increases. If a safety-relevant component is affected by such a malfunction, in the worst case this may result in injury to humans. The aim of International Standard ISO 26262 (Road vehicles—Functional safety) is to ensure the functional safety of systems having electrical or electronic components in road vehicles.

The standard procedure model provides that within the scope of a hazard analysis and risk assessment, potential hazards due to malfunctions of the examined system in specific driving situations are identified. Based on various criteria, an automotive safety integrity level (ASIL) is then associated with each safety-relevant hazard. To reduce hazards that are classified as not relevant to safety, no requirements are to be imposed on the system in question that go beyond customary quality management (QM).

Controls for gasoline engines and diesel engines according to the related art are based on a safety concept, developed by Robert Bosch GmbH and adapted and refined by the EGAS work group of the Verband der Automobilindustrie (VDA) (German Association of the Automotive Industry), known in professional circles as the "EGAS monitoring concept" or "three-level concept." According to this concept, the three referenced levels are as follows:

1. A functional level performs engine control functions such as achieving a requested torque, monitoring components, diagnosing input and output variables, and error response. The integrity of signal messages is ensured on this level by use of check sums, for example.
2. A function monitoring level is used to recognize faulty processes on the functional level, for example by monitoring the achieved torque or the vehicle acceleration, and triggering the response provided for the fault case on the functional level.
3. A computer monitoring level includes a monitoring module that is independent of the function computer, and that uses a challenge-response method to check the proper execution of the program commands of the function computer, and in the fault case triggers responses that are independent of the function computer.

German Patent Application No. DE 10 2013 206 185 A1 relates to a method for data transmission between a sensor and an electronic control unit (ECU), using a hardware security module (HSM), the transmitted sensor data being secured against manipulation by transmitting them from the sensor to the ECU via a first logical data transmission channel at a first data transmission rate, and by transmitting a cipher-based message authentication code (CMAC) via a second logical data transmission channel at a second data transmission rate. At least once at the beginning of a data transmission session, a session key is transmitted from the ECU to the sensor via a third logical data transmission channel and received by same, and used, at least for the current session, for generating the MAC or CMAC.

German Patent Application No. DE 10 2017 209 557 A1 describes a method for protecting a vehicle network of a vehicle from transmission of manipulated data. The vehicle network includes multiple network nodes. At least one first network node in the vehicle network compares received messages to the messages associated with the first network node, and recognizes the transmission of manipulated data when one of the received messages matches a message associated with the first network node, but which the first network node has not sent. The first network node compares only selected messages of the received messages to the messages associated with the first network node, or compares the received messages only to selected messages associated with the first network node.

SUMMARY

The present invention provides a method for checking an incoming message, a corresponding device, a corresponding computer program, and a corresponding memory medium.

According to the present invention, the MAC is used to check the authenticity (authentication) as well as the soundness (integrity) of the incoming message. A cyclic redundancy check (CRC) or evaluation of conventional check sums may thus be dispensed with. Instead, evaluation is similarly carried out on the functional level and monitoring level by use of an HSM of the MAC.

A special feature of the approach provided here is that it avoids a double MAC check by the HSM for all received safety-relevant messages. The burden on the HSM with regard to a redundant MAC computation is thus reduced. For a periodic function check at intervals of 10 ms, for example, according to the present invention sufficient functional security would be ensured without placing an excessive burden on the HSM. In addition, in this regard a so-called lockstep computer architecture or other types of hardware enhancements for error recognition are thus superfluous.

Advantageous refinements and improvements of the basic features of the present invention are possible as a result of the measures disclosed herein. Thus there may be a provision that while the authentication takes place on the functional level, the mentioned function check, however, takes place on the monitoring level via continuous monitoring of the hardware security module. In this way, the correctness of the hardware (HW) and software (SW) of the HSM is ensured based on the monitoring SW, without the need for the HSM to return the MAC. In addition, the use of the keys, necessary for the comparison of the MAC, thus remains limited to the HSM.

BRIEF DESCRIPTION OF THE DRAWINGS

Exemplary embodiments of the present invention are illustrated in the figures and explained in greater detail in the following description.

DETAILED DESCRIPTION OF EXAMPLE EMBODIMENTS

Figure 1:
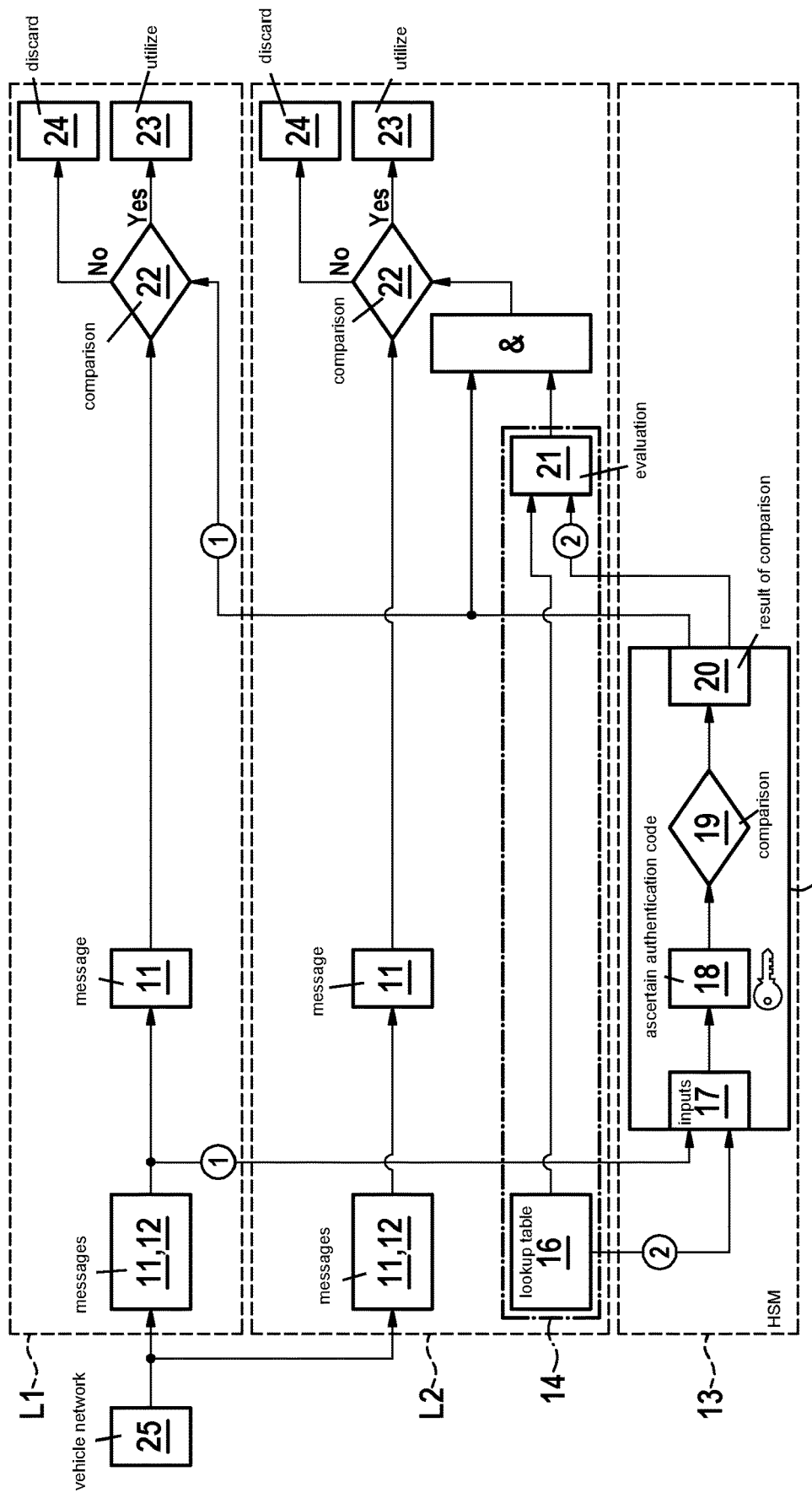
FIG. 1 shows the flow chart of a method according to a first specific embodiment of the present invention.

FIG. 1 illustrates a concept according to the present invention for receiving messages via the vehicle networks (CAN, LIN, FlexRay, etc.) (25), using an encrypted correctness attribute in the form of a MAC. The information security and operational safety of method (10) are ensured by the combination of two measures (1, 2), which are explained below:

On the one hand, an initial conventional evaluation of the message and verification thereof, using return values of the MAC check, take place on QM functional level (L1). For this purpose, for each received safety-relevant message (11, 12) the consistency is verified by HSM (13) within the scope of MAC check (15), without useful data (11) having to be provided with further check sums. The result of this comparison (15) is transferred (1) from the HSM SW to the monitoring SW (L2).

The corresponding useful data of the MAC check are compared to redundant received message (11, 12) via the L2 SW and subsequently linked to the result of the consistency check. The transmission path of the useful data via the L1 SW and HSM SW may thus be checked for possible bit errors. Due to accepting the result of the consistency check for message (11, 12), a new check of the consistency from the L2 SW by HSM (13) may be dispensed with.

On the other hand, continuous monitoring (14) of HSM (13) and the corresponding driver take place. Since HSM (13) has no lockstep architecture or other types of hardware operational safety features within the meaning of ISO 26262, and the HSM SW has not been developed using an ASIL classification, this portion of the software and of the hardware is continuously checked for proper functionality.

Continuous monitoring (14) of the correct functioning of HSM (13) is achieved by a challenge-response communication with the aid of MAC check (15). Only inputs (17) or data sets (useful data, MAC, etc.) that have already been verified as correct during the driving cycle are stored in a lookup table (16).

Continuous monitoring (14) should take into account the risk of a false-positive comparison (15). For this purpose, the data from lookup table (16) for MAC check (15) are falsified byte-by-byte. These correct and incorrect inputs (17) are provided to the HSM SW within the scope of an additional MAC check (15) according to a predefined pattern. Evaluation (21) of result (20) is then intended to recognize the pattern (1-0-2-0-1-0, for example), using an error counter.

If an error is determined and the pattern fails (21) comparison (15), HSM HW and HSM SW are classified as faulty, useful data (11) of the entire CAN communication are discarded (24), and instead a change is made to reliable substitute values in order to put the vehicle into an operationally safe state.

Figure 2:
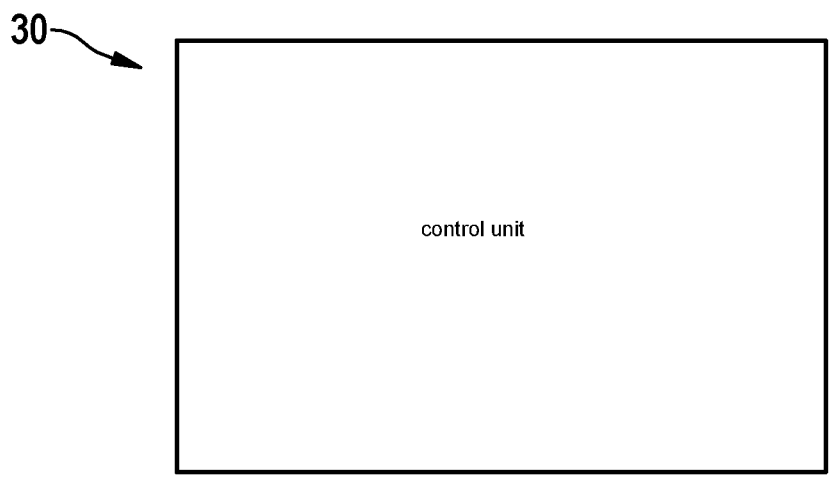
FIG. 2 schematically shows a control unit according to a second specific embodiment of the present invention.

This method (10) may be implemented, for example, in software or hardware or in a mixed form of software and hardware, for example in a control unit (30), as depicted in the schematic illustration in FIG. 2.

Example embodiments of the present invention are set forth in the following numbered paragraphs.

Paragraph 1. A method (10) for checking an incoming message (11, 12) that includes useful data (11) and a message authentication code (12), characterized by the following features:
   based on the message authentication code (12), an authentication (1) of the useful data (11) is performed by a hardware security module (13) and
   the hardware security module (13) is subjected to a function check (2).

Paragraph 2. The method (10) as recited in Paragraph 1, characterized by the following features:
   the authentication (1) takes place on a functional level (L1) and
   the function check (2) takes place via continuous monitoring (14) of the hardware security module (13) on a monitoring level (L2).

Paragraph 3. The method (10) as recited in Paragraph 2, characterized by at least one of the following features:
   the functional level (L1) satisfies general quality standards and
   the monitoring level (L2) satisfies safety requirements according to ISO 26262.

Paragraph 4. The method (10) as recited in one of Paragraphs 1 through 3, characterized by the following features:
   the authentication (1) and function check (2) include a comparison (15) of the message authentication code (12) and
   for the function check (2), an input (17) for the comparison (15) is taken from a lookup table (16).

Paragraph 5. The method (10) as recited in Paragraph 4, characterized by the following features:
   for the comparison (15), a computational message authentication code is ascertained (18) and a comparison (19) of the computational message authentication code to the input (17) is made and
   a result (20) of the comparison (19) is output for the authentication (1) or function check (2).

Paragraph 6. The method (10) as recited in Paragraph 5, characterized by the following features:
   for the function check (2), the result (20) is evaluated (21) based on the lookup table (16) and
   if the message authentication code (12) satisfactorily passes (22) the comparison (15), the useful data (11) are utilized (23), or otherwise discarded (24).

Paragraph 7. The method (10) as recited in one of Paragraphs 1 through 6, characterized by the following feature:
   the message (11, 12) is received via a vehicle network (25).

Paragraph 8. A computer program that is configured to carry out the method (10) as recited in one of Paragraphs 1 through 7.

Paragraph 9. A machine-readable memory medium on which the computer program as recited in Paragraph 8 is stored.

Paragraph 10. A device (30) that is configured to carry out the method (10) as recited in one of Paragraph 1 through 7.

What is claimed is:

1. A method for checking an incoming message that includes useful data and a message authentication code, the method comprising the following steps:
   performing, by a hardware security module, an authentication of the useful data based on the message authentication code;
   performing a function check on the hardware security module, wherein:
   the authentication and function check include a comparison of the message authentication code;

for the function check, an input for the comparison is taken from a lookup table;

for the comparison, a computational message authentication code is ascertained and a comparison of the computational message authentication code to the input is made; and a result of the comparison is output for the authentication or the function check;

utilizing the useful data when the result indicates satisfactorily passing of the comparison; and discarding the useful data when the result indicates satisfactorily not passing of the comparison.

2. The method as recited in claim 1, wherein:
the authentication takes place on a functional level; and
the function check take place via continuous monitoring of the hardware security module on a monitoring level.

3. The method as recited in claim 2, wherein:
the functional level satisfies general quality standards; and
the monitoring level satisfies safety requirements according to ISO (International Organization for Standardization) 26262.

4. The method as recited in claim 1, wherein: for the function check, the result is evaluated based on the lookup table.

5. The method as recited in claim 1, wherein the message is received via a vehicle network.

6. A non-transitory machine-readable memory medium on which is stored a computer program for checking an incoming message that includes useful data and a message authentication code, the computer program, when executed by a computer, causing the computer to perform the following steps:

performing, by a hardware security module, an authentication of the useful data based on the message authentication code;

performing a function check on the hardware security module, wherein:

the authentication and function check include a comparison of the message authentication code;

for the function check, an input for the comparison is taken from a lookup table;

for the comparison, a computational message authentication code is ascertained and a comparison of the computational message authentication code to the input is made; and a result of the comparison is output for the authentication or the function check utilizing the useful data when the result indicates satisfactorily passing of the comparison; and discarding the useful data when the result indicates satisfactorily not passing of the comparison.

7. A device configured to check an incoming message that includes useful data and a message authentication code, the device including a hardware security module and configured to:

perform, using the hardware security module, an authentication of the useful data based on the message authentication code;

perform a function check on the hardware security module, wherein:

the authentication and function check include a comparison of the message authentication code;

for the function check, an input for the comparison is taken from a lookup table;

for the comparison, a computational message authentication code is ascertained and a comparison of the computational message authentication code to the input is made; and a result of the comparison is output for the authentication or the function check;

utilize the useful data when the result indicates satisfactorily passing of the comparison; and discard the useful data when the result indicates satisfactorily not passing of the comparison.

* * * * *